United States Patent
Li et al.

(10) Patent No.: US 11,188,263 B2
(45) Date of Patent: Nov. 30, 2021

(54) METHOD OF WRITING DATA TO A STORAGE DEVICE USING AGGREGATED QUEUES

(71) Applicant: INNOGRIT TECHNOLOGIES CO., LTD., Shanghai (CN)

(72) Inventors: Lei Li, Shanghai (CN); Ying Chu, Shanghai (CN); Qian Cheng, Shanghai (CN); Qun Zhao, Shanghai (CN)

(73) Assignee: INNOGRIT TECHNOLOGIES CO., LTD., Shanghai (CN)

( * ) Notice: Subject to any disclaimer, the term of this patent is extended or adjusted under 35 U.S.C. 154(b) by 0 days.

(21) Appl. No.: 16/746,845

(22) Filed: Jan. 18, 2020

(65) Prior Publication Data
US 2020/0272360 A1    Aug. 27, 2020

(30) Foreign Application Priority Data
Feb. 27, 2019    (CN) .......................... 201910145200.9

(51) Int. Cl.
*G06F 3/06*    (2006.01)

(52) U.S. Cl.
CPC ............ *G06F 3/0659* (2013.01); *G06F 3/064* (2013.01); *G06F 3/0611* (2013.01); *G06F 3/0673* (2013.01)

(58) Field of Classification Search
CPC ...... G06F 3/061; G06F 3/0611; G06F 3/0638; G06F 3/064; G06F 3/0655; G06F 3/0659; G06F 3/067; G06F 3/0673; G06F 3/0679
See application file for complete search history.

(56) References Cited

U.S. PATENT DOCUMENTS

| | | | |
|---|---|---|---|
| 2011/0058440 A1* | 3/2011 | Smith ................ | G06F 11/3034 365/229 |
| 2013/0103918 A1* | 4/2013 | Dictos ................ | G06F 3/0656 711/171 |
| 2016/0306552 A1* | 10/2016 | Liu ....................... | G06F 3/0679 |
| 2016/0313919 A1* | 10/2016 | Chambliss ........... | G06F 3/0673 |
| 2018/0322088 A1 | 11/2018 | Kamble et al. | |

FOREIGN PATENT DOCUMENTS

| | | |
|---|---|---|
| CN | 101727299 A | 6/2010 |
| CN | 102510493 A | 6/2012 |
| CN | 102750226 A | 10/2012 |
| CN | 105740125 A | 7/2016 |
| CN | 109032530 A | 12/2018 |

\* cited by examiner

*Primary Examiner* — Larry T Mackall
(74) *Attorney, Agent, or Firm* — Womble Bond Dickinson (US) LLP

(57) ABSTRACT

The present disclosure relates to a method for data writing, a device and a storage medium, wherein the method includes acquiring a first data to be written and saving a plurality of sub-blocks of the first data in one or more designated aggregated queue of multiple aggregated queues according to an aggregation strategy; performing, in each designated aggregated queue, data interception on a plurality of sub-blocks in a current queue to obtain a second data to be written; and writing the second data in a storage device. The data distribution written in the storage device becomes more ideal by a multi-queue aggregation, and thus the method for data writing according to the embodiments of the present disclosure can reduce the time consumed in reading the storage device effectively.

18 Claims, 5 Drawing Sheets

METHOD OF WRITING DATA TO A STORAGE DEVICE USING AGGREGATED QUEUES

CROSS-REFERENCE TO RELATED APPLICATION

The present application is based upon and claims the benefit of a priority of Chinese Patent Application No. 201910145200.9, filed on Feb. 27, 2019, the entire contents of which are incorporated herein by reference.

TECHNICAL FIELD

The present disclosure relates to the field of storage in computer, and more particularly, to a method for data writing, a device and a storage medium thereof.

BACKGROUND

Reading and Writing (R/W) performance is a key index of a Solid State Disk (hereinafter referred to as SSD). An SSD master undertakes important tasks such as data management, performance exploration and lifetime maintenance. In the same NAND-flash memory or hardware environment, different SSD masters may have imperfectly the same or significantly different R/W performances mainly due to good or poor R/W algorithms therein.

In the existing writing algorithms, the data blocks are sequentially aggregated in an aggregated queue (or called a flushing queue) regardless of the length of the data block, which results in that the data distribution written into the memory is unsatisfactory. In the process of reading data in the NAND-flash memory, when a data block is distributed over a plurality of multi-plane pages (hereinafter referred to as MP), if a Host reads the data block, a plurality of Reading Commands need to be issued, consuming a plurality of trigger times and prolonging the time of reading the data.

SUMMARY

In view of the above, there is provided a method for data writing, a device and a storage medium thereof in the present disclosure. In this way, distribution of the data written into the memory is more ideal and the time consumed to read the memory is reduced.

According to an aspect of the present disclosure, there is described a method for data writing, including: acquiring a first data to be written and saving a plurality of sub-blocks of the first data in one or more designated aggregated queues of multiple aggregated queues according to an aggregation strategy; performing, in each designated aggregated queue, data interception on a plurality of sub-blocks in a current queue to obtain a second data to be written; and writing the second data in a storage device.

According to another aspect of the present disclosure, there is described a device for data writing, including: a processor; a memory for storing instructions executable by the processor, wherein the processor is configured to implement the above method when executing the instructions.

According to yet another aspect of the present disclosure, there is described a non-volatile computer readable storage medium on which computer program instructions are stored; when the computer program instructions are executed by a processor, the computer program instructions cause the processor to perform the above method.

By aggregating the data to be written in multiple aggregated queues, intercepting the data blocks in each aggregated queue and writing the intercepted data in the storage device, the distribution of data blocks written in the storage device becomes more ideal. The method for data writing according to embodiments in the present disclosure enables the distribution of data written in the storage device to be more ideal, reducing the time consumed in reading the data of the storage device.

Further features and aspects of the present disclosure will become apparent from the following detailed description of exemplary embodiments.

BRIEF DESCRIPTION OF THE DRAWINGS

The accompanying drawings, which are incorporated in and constitute a part of this specification, together with the description, illustrate exemplary embodiments, features and aspects of the present disclosure, and serve to explain the principles of the present disclosure.

DETAILED DESCRIPTION

Figures 1, 2:
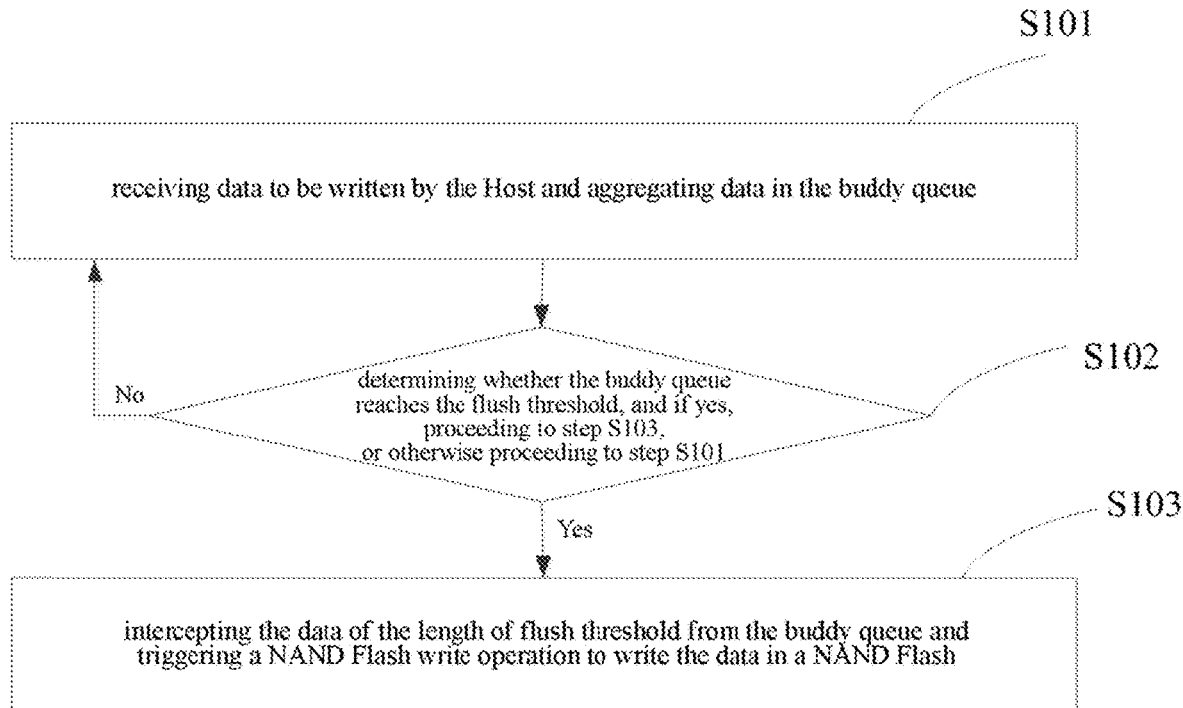
FIG. 1 is a flowchart illustrating an implementation process of a method for data writing in a related art according to an embodiment of the present disclosure.
FIG. 2 is a schematic diagram illustrating an implementation process of a method for data writing in a related art according to an embodiment of the present disclosure.

It must be noted that as used herein and in the appended claims, the singular forms "a", "an", and "the" include plural referents unless the context clearly dictates otherwise. Thus, for example, reference to "a peptide" includes a plurality of peptides.

Various exemplary embodiments, features, and aspects of the present disclosure are described in detail below with reference to the drawings. Same reference signs in the drawings denote the same or similar elements. Although the various aspects of the embodiments are illustrated in the drawings, the drawings are not necessarily drawn to scale unless otherwise indicated.

Herein the term "exemplary" means "used as an instance or example, or explanatory". An "exemplary" example given here is not necessarily construed as being superior to or better than other examples.

In addition, numerous specific details are set forth in the detailed implementations below so as to better illustrate the present disclosure. Those skilled in the art will appreciate that the present disclosure may be implemented without some specific details. In some embodiments, methods, means, elements and circuits that are well known to those skilled in the art are not described in detail so as to highlight the subject matter of the present disclosure.

FIG. 1 is a flowchart illustrating an implementation process of a method for data writing in a related art according to an embodiment of the present disclosure. As shown in FIG. 1, the implementation process includes:

Step S101: receiving data to be written by the host and aggregating data in the flushing queue;

Step S102: determining whether the flushing queue reaches the flushing threshold, and if yes, proceeding to step S103, or otherwise to step S101;

Step S103: intercepting data of a length of the flushing threshold from the flushing queue and triggering a NAND Flash write operation to write the data in a NAND Flash.

FIG. 2 is a schematic diagram illustrating a method for data writing according to an embodiment of the present disclosure, based on the implementation process of FIG. 1. In FIG. 2, W0-W7 are data written by the host sequentially received by the SSD master; the DU (Data Unit) in the data has a designated size, usually 4 k or 8 K in the SSD; MP page=4 DU (or 8 DU or 16 DU), the size of the MP page is determined by the type of NAND, for example, the flushing threshold=4 MP pages=16 DU, wherein the lengths of the data blocks W0/W4/W5/W7 are 1 DU, the lengths of the data blocks W2/W3 are 2 DU and the lengths of the data blocks W1/W6 are 4 DU.

FIG. 2 shows that data blocks W0/W2/W4/W5/W7 are located on a single MP page, and one NAND read operation will be triggered for the reading of each data block; data blocks W1/W3/W6 are located on two MP pages and two NAND read operations will be triggered for the reading of each block of data. If the host reads the W0 to W7 data in sequence, 11 NAND read operations will be triggered in total, and 11 trigger times (abbreviated as Tr) will be consumed in a condition where the command pressure is large.

Figure 3:
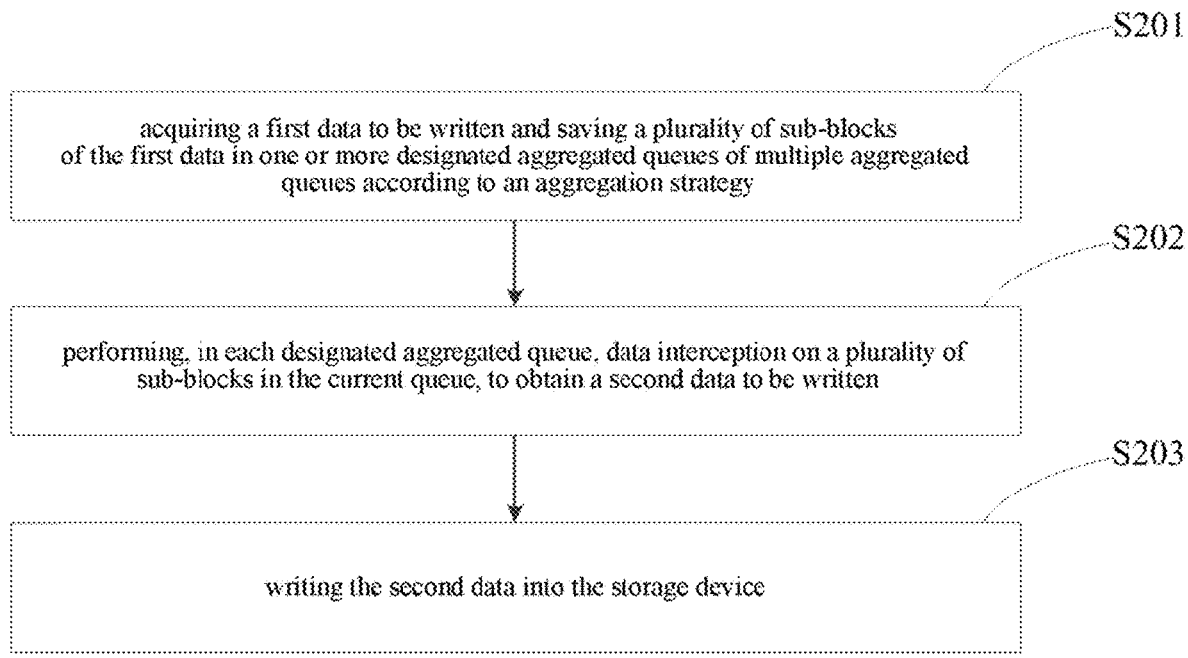
FIG. 3 is a flowchart illustrating a method for data writing according to an embodiment of the present disclosure.

FIG. 3 is a flow chart illustrating a method for data writing according to an embodiment of the present disclosure. As shown in FIG. 3, the method includes the following steps:

Step S201: acquiring a first data to be written and saving a plurality of sub-blocks of the first data in one or more designated aggregated queues of multiple aggregated queues according to an aggregation strategy.

For example, the aggregated queue (or called flushing queue) is denoted by Qn, where n denotes the alignment length of DU and Qn denotes a queue that is aggregated by n DU lengths. In the process of the embodiments of the present disclosure, the aggregated queues are composed of a plurality of queues with different n values, the data of different lengths will be aggregated in an appropriate queue. For example, multiple aggregated queues include four queues Q1/Q2/Q4/Q8, and if the length of the data block is 1 DU (the aligned length is 1), the data block is aggregated in Q1; if the length of the data block is 2 DU (1 or 2 alignment), the data block is preferable to be aggregated in Q2; if the length of the data block is 4 DU (1 or 2 or 4 alignment), the data block is preferable to be aggregated in Q4; if the length of the data block is 8 DU (1 or 2 or 4 or 8 alignment), the data block is preferable to be aggregated in Q8.

Step S202: performing, in each designated aggregated queue, data interception on a plurality of sub-blocks in the current queue, to obtain a second data to be written. For example, the data of the designated aggregated queue may be intercepted according to a designated data length, obtaining the second data to be written. The designated data length for interception is not limited in the present disclosure.

Step S203: writing the second data into the storage device, for example, writing the second data into the storage device by triggering writing commands for the storage device.

By aggregating the data to be written in multiple aggregated queues, intercepting the data blocks in each aggregated queue and writing the intercepted data in the storage device, the distribution of data blocks written in the storage device becomes more ideal. The method for data writing according to the above embodiments of the present disclosure makes the distribution of data written in the storage device to be ideal, reducing the time consumed in reading the data of the storage device.

In a possible implementation, the step of acquiring a first data to be written and saving a plurality of sub-blocks of the first data in one or more designated aggregated queues of multiple aggregated queues according to an aggregation strategy, includes: in different designated aggregated queues, aggregating according to the designated aggregation strategy. For example, Table 1 shows that when the length of the first data is 5 DU, the designated aggregation strategy is storing in queues Q1 and Q4.

In a possible implementation, the step of acquiring a first data to be written and saving a plurality of sub-blocks of the first data in one or more designated aggregated queues of multiple aggregated queues according to an aggregation strategy includes: acquiring the data length of the first data, obtaining the designated aggregation strategy according to the data length, receiving the first data, and saving the first data in one or more designated aggregated queues of multiple aggregated queues according to the designated aggregation strategy. As shown in Table 1 (aggregation strategy example 1), when the length of the acquired first data is 8 DU, the data is saved in the designated aggregated queue Q8 under the instruction of the aggregation strategy.

In a possible implementation, acquiring the data length of the first data to be written and obtaining the designated aggregation strategy according to the data length include: obtaining the designated aggregation strategy according to the data length and the routing table, wherein the routing table includes correspondences between data lengths and designated aggregation strategies.

For example, when the multiple aggregated queues include four queues Q1/Q2/Q4/Q8, Table 1 and Table 2 show correspondences between data lengths and aggregation strategies; however, it is understandable for those skilled in the art that the aggregation strategies are not limited to the exemplified aggregation strategies, and those skilled in the art can set the aggregation strategies according to the actual needs.

As shown in Table 2 (aggregation strategy example 2), data of 3 DU can be decomposed into: the first 1 DU data is aggregated to the queue buddy Q1 and the last 2 DU data are aggregated to the queue buddy Q2. As shown in Table 1, the data of 3 DU can also be aggregated to the queue buddy Q4 by adding one placeholder (abbreviated as PH). The place holder (PH) is such a data placeholder that when the length of some data-written-by-host cannot satisfy an n alignment, the queue Qn can be forced to align by a length n by filling the PH. The way of aggregating can be set as needed, and obviously, the data-written-by-host of different lengths can be aggregated in different manners. The aggregation routing table, buddy route, is designed to describe how the data-written-by-host of different lengths can be aggregated in a plurality of queue buddies Q.

TABLE 1

| written data length (DU) | Queue Q1 (DU) | Queue Q2 (DU) | Queue Q4 (DU) | Queue Q8 (DU) |
|---|---|---|---|---|
| 1 | 1 | 0 | 0 | 0 |
| 2 | 0 | 2 | 0 | 0 |
| 3 | 1 | 0 | 3 + 1PH | 0 |
| 4 | 0 | 0 | 4 | 0 |
| 5 | 1 | 0 | 4 | 0 |
| 6 | 0 | 0 | 4 | 2 + 6PH |
| 7 | 0 | 0 | 0 | 7 + 1PH |
| 8 | 0 | 0 | 0 | 8 |
| ... | | | | |
| 30 | 0 | 0 | 0 | 30 + 2PH |
| 31 | 0 | 0 | 0 | 31 + 1PH |
| 32 | 0 | 0 | 0 | 32 |

TABLE 2

| written data length (DU) | Queue Q1 (DU) | Queue Q2 (DU) | Queue Q4 (DU) | Queue Q8 (DU) |
|---|---|---|---|---|
| 1 | 1 | 0 | 0 | 0 |
| 2 | 0 | 2 | 0 | 0 |
| 3 | 1 | 2 | 0 | 0 |
| 4 | 0 | 0 | 4 | 0 |
| 5 | 1 | 0 | 4 | 0 |
| 6 | 0 | 2 | 4 | 0 |
| 7 | 0 | 0 | 0 | 7 + 1PH |
| 8 | 0 | 0 | 0 | 8 |
| ... | | | | |
| 30 | 0 | 0 | 0 | 30 + 2PH |
| 31 | 0 | 0 | 0 | 31 + 1PH |
| 32 | 0 | 0 | 0 | 32 |

For example, Table 2 shows that when the length of data is 6 DU, the data will be aggregated in the designated queues Q2 and Q4, or be aggregated in the designated queues Q4 and Q8 according to the aggregation strategy in Table 1.

In a possible implementation, the step of receiving the first data and saving the first data in one or more designated aggregated queues of multiple aggregated queues according to the designated aggregation strategy includes: receiving a data unit DU of the first data, obtaining a designated aggregated queue in which the DU needs to be saved according to the designated aggregation strategy and an offset of the DU in the first data, and saving the DU in the designated aggregated queue. The first data includes a plurality of DUs. For example, Table 2 shows that when the written data is of 3 DU, the first DU is saved in the queue Q1, the second DU is saved in Q2 and the third DU is saved in Q2; that is, the DU is saved in the designated aggregation queue according to the designated aggregation strategy of saving in Q1 and Q2 and the offset position of the received DU in the first data.

Figure 4:
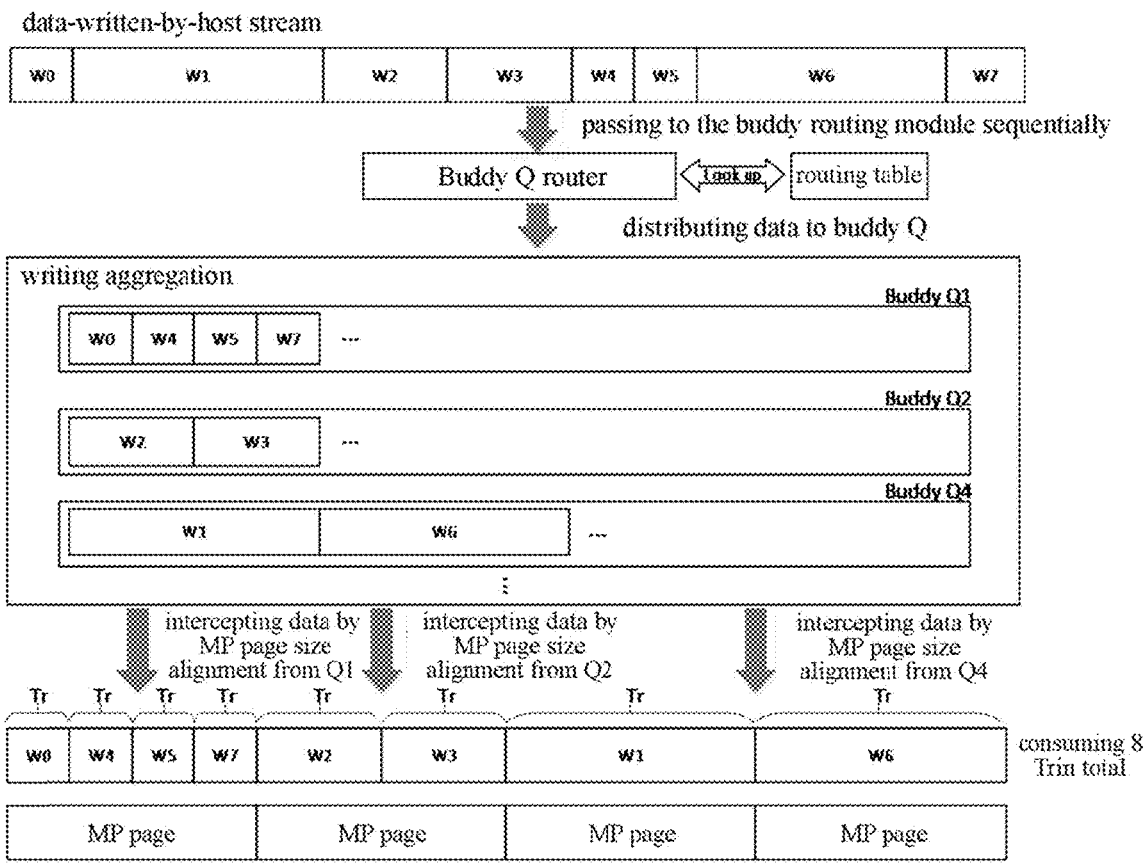
FIG. 4 is a schematic diagram illustrating an implementation process of a method for data writing according to an embodiment of the present disclosure.

FIG. 4 is a schematic diagram illustrating an implementation process of a method for data writing according to an embodiment of the present disclosure. As shown in FIG. 4, the first data to be written is acquired, that is, a plurality of data blocks w0 to w7 in the data-written-by-host are saved in the buddy routing module, and the data blocks are distributed to different aggregated queues buddy Q according to the routing table in the buddy Q router; for example, data blocks w0, w4, w5, w7 are saved in the queue buddy Q1, data blocks w2, w3 are saved in the queue buddy Q2, and w1, w6 are saved in the queue buddy Q4; intercepting data from the aggregated queues Q1, Q2 and Q4 according to the multi-plane page alignment, to obtain a plurality of target data, and the second data are obtained based on the plurality of target data. In a possible implementation, it is determined whether the total quantity of the plurality of target data reaches a threshold, and if yes, the second data is written to the storage device.

Figure 5:
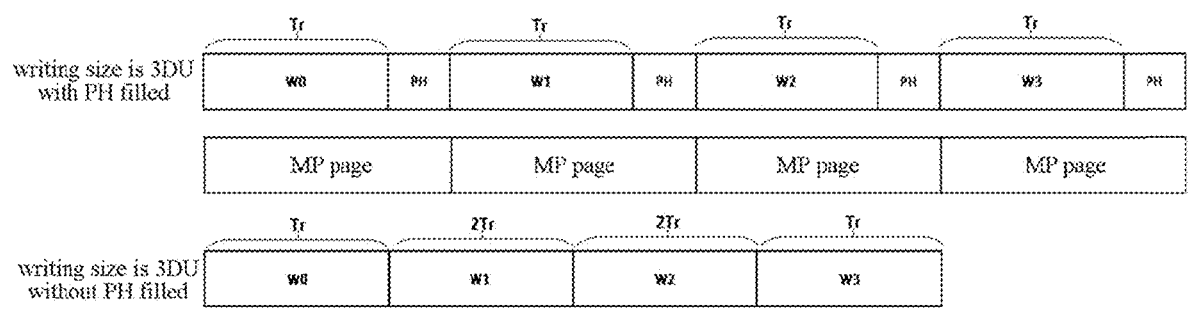
FIG. 5 is a schematic diagram illustrating an example of the use of placeholders according to an embodiment of the present disclosure.

In a possible implementation, the method for data writing further includes: when saving the plurality of sub-blocks of the first data to the designated aggregated queue, if the data lengths of the sub-blocks cannot meet the alignment in each designated aggregated queue, filling the designated aggregated queue with placeholders to fill up the designated aggregated queue. FIG. 5 is a schematic diagram illustrating an example of use of the placeholder according to an embodiment of the present disclosure. In the example shown in FIG. 5, the data lengths of the data blocks W0 to W3 are all 3 DU. If W0 to W3 are aggregated in the queue buddy Q4, PHs are added so that each data is aggregated in the queue Q4 with a 4 alignment. It takes six trigger times Tr to read the data if there is no PH filled; but only four trigger times Tr are needed to read the same data with PHs filled, thereby the trigger time Tr taken to read the data can be reduced.

As shown in FIG. 5, the position where each PH locates has only one consecutive PH. When writing the data, if there is data in queue Q1, the data will be taken from queue buddy Q1 and replaced to the position where PH locates, until there is no data in the queue Q1 or all PHs have been replaced. The data in the queue Q1 is selected for the replacement because the continuity of the PH to be replaced is 1 and taking out one DU of data from the queue buddy Q1 does not destroy the alignment feature of the queue Q1.

In a possible implementation, the method further includes: in the process of writing the second data, if a length of consecutive placeholders or a part thereof is equal to an aligned length of any of the designated aggregated queues and there is data of the aligned length in the aggregated queue, intercepting data of the aligned length from the head of the aggregated queue to replace consecutive placeholders of the equal length, otherwise filling the positions of the placeholders with dummy data. In an example, in the process of writing the second data, if the number of consecutive PHs is equal to the aligned length of DU in a designated aggregated queue Q, it is possible to replace PHs with the data in the aggregated queue Q, or otherwise filling the positions of the placeholders with dummy data.

Figure 6:
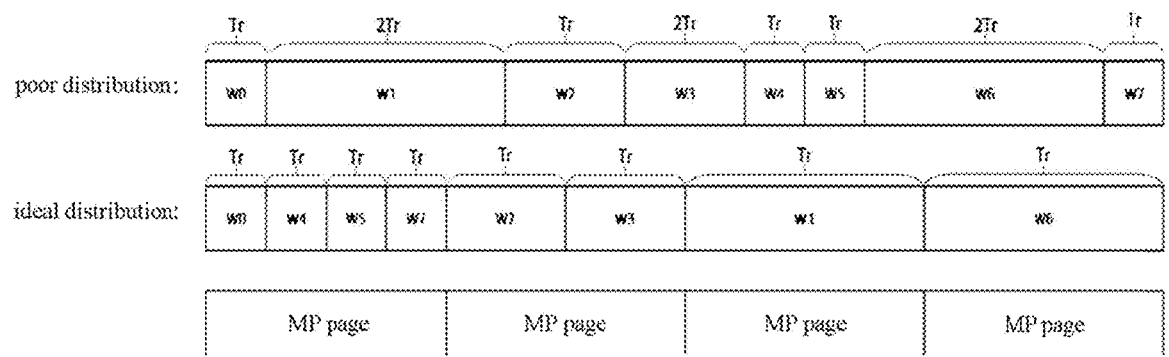
FIG. 6 is a schematic diagram illustrating a comparison between a relatively poor data distribution and an ideal data distribution according to an embodiment of the present disclosure.

In a possible implementation, the step of performing, in each designated aggregated queue, data interception on a plurality of sub-blocks in the current queue to obtain the second data to be written includes: intercepting data from the aggregation queue with a single-plane page or a multi-plane page alignment to obtain a plurality of target data and obtaining the second data according to the plurality of target data. As shown in FIG. 6, in the existing aggregation algorithm, data aggregation is performed by the order of the data blocks in the data stream in the flushing queue Q regardless of the data length of the data. After being written to NAND, the distribution of the data blocks w1 to w7 in FIG. 2 is shown in the relatively poor distribution in FIG. 6. In the embodiments of the present disclosure, the ideal distribution of w0 to w7 in NAND considering the data length is shown in the ideal distribution of FIG. 6. In the ideal distribution, it needs to trigger the NAND reading process only once in the process of reading each of data blocks w0 to w7, and it only needs to trigger eight times of NAND reading if the host reads data from w0 to w7 in sequence, consuming at most eight Tr times. Obviously, when reading the same amount of data, the ideal distribution saves three trigger times Tr compared to the existing solution and reduces the read delay. A more ideal distribution of stored data is obtained by intercepting data from each aggregated queue according to the multi-plane page alignment manner. The data blocks w1 and w3 are thus prevented from being distributed on different MP pages as compared to the existing data distribution. When triggered, the reading of data blocks w1 and w3 can be triggered only once respectively, saving the time for reading data.

In a possible implementation, the step of writing the second data into the storage device includes: determining whether a total amount of the plurality of target data reaches a threshold, and if yes, writing the second data to the storage device.

For example, if the threshold for flushing is 16 DU, then once the amount of intercepted target data reaches 16 DU, the 16 DU of the intercepted data is the second data, and will be written in the storage device.

It should be noted that although the method for data writing is described above with the NAND flash memory as an example, those skilled in the art can understand that the present disclosure is not limited thereto. In fact, the user can flexibly set the memory type to be written with the method according to personal preference and/or actual application scenario, as long as the ideal distribution of the stored data can save the time in the process of reading the data.

By aggregating the data to be written in multiple aggregated queues, intercepting the data blocks in each aggregated queue and writing the intercepted data in the storage device, the distribution of data blocks written in the storage device becomes more ideal. The method for data writing according to the above embodiment of the present disclosure enables the distribution of data written in the storage device to be ideal, reducing the time consumed in reading the data of the storage device.

Figure 7:
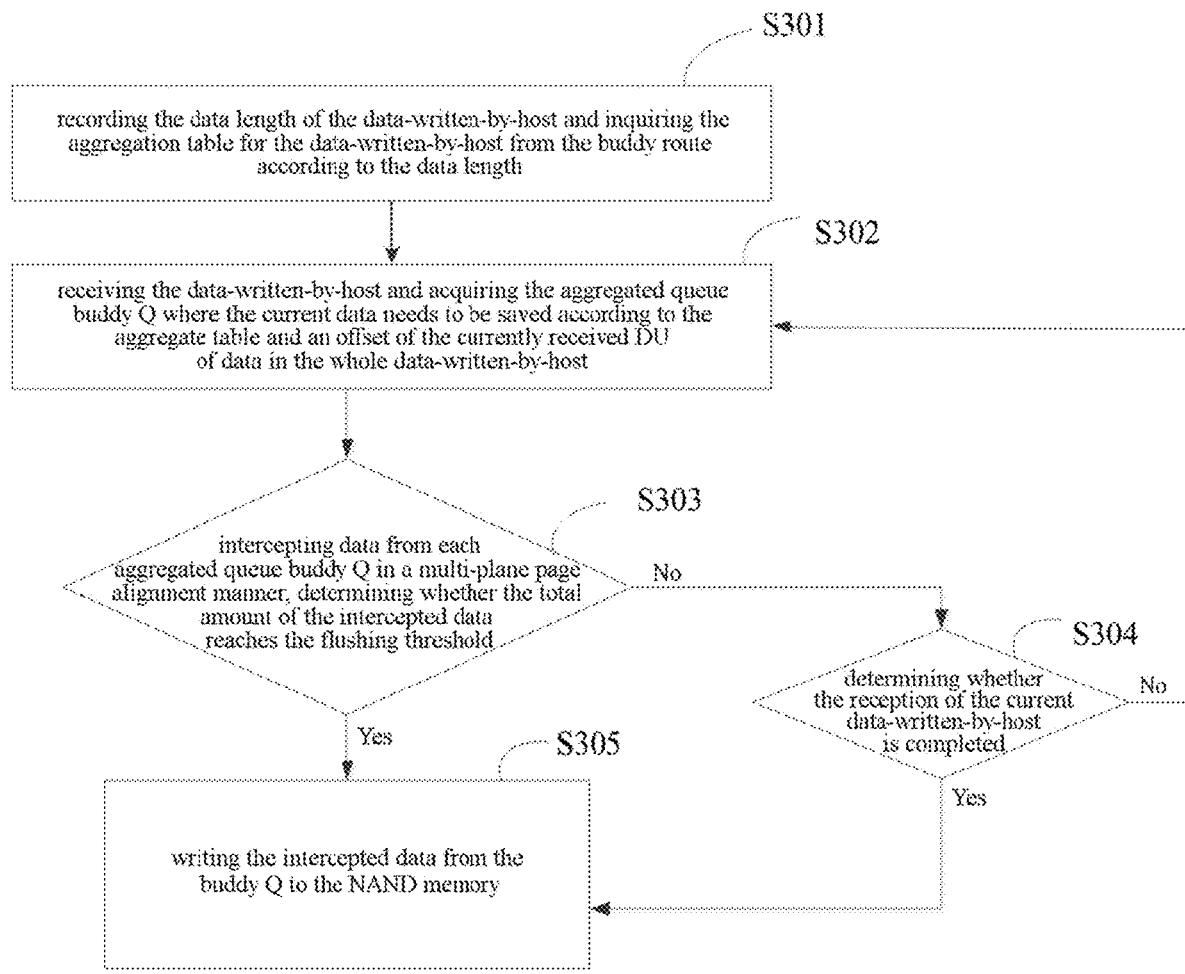
FIG. 7 is a flowchart of a Buddy Write algorithm for a Buddy aggregated queue according to an embodiment of the present disclosure.

Application example:

FIG. 7 shows a flow of a Buddy Write algorithm for a Buddy aggregated queue according to an embodiment of the present disclosure, the algorithm comprising the following steps:

Step S301: recording the data length of the data-written-by-host and inquiring the aggregation table for the data-written-by-host from the buddy route according to the data length.

Step S302: receiving the data-written-by-host and acquiring the aggregated queue buddy Q where the current data needs to be saved according to the aggregate table and an offset of the currently received DU of data in the whole data-written-by-host, and saving the current data therein.

Step S303: intercepting data from each aggregated queue buddy Q in a multi-plane page alignment manner, determining whether the total amount of the intercepted data reaches the flushing threshold, and if yes, proceeding to step S305, otherwise to step S304.

Step S304: determining whether the reception of the current data-written-by-host is completed. If yes, proceeding to step S305, or otherwise proceeding to step S302.

Step S305: writing the intercepted data from the buddy Q to the NAND memory.

The device for data writing according to an embodiment of the present disclosure comprises: a processor; a memory for storing instructions executable by the processor; wherein the processor is configured to implement the method when executing the instructions.

In an exemplary embodiment, the processor may be implemented by one or more application specific integrated circuits (ASICs), digital signal processors (DSPs), digital signal processing devices (DSPDs), programmable logic devices (PLDs), field programmable gate array (FPGA), controller, microcontroller, microprocessor or other electronic elements for executing the above methods.

Figure 8:
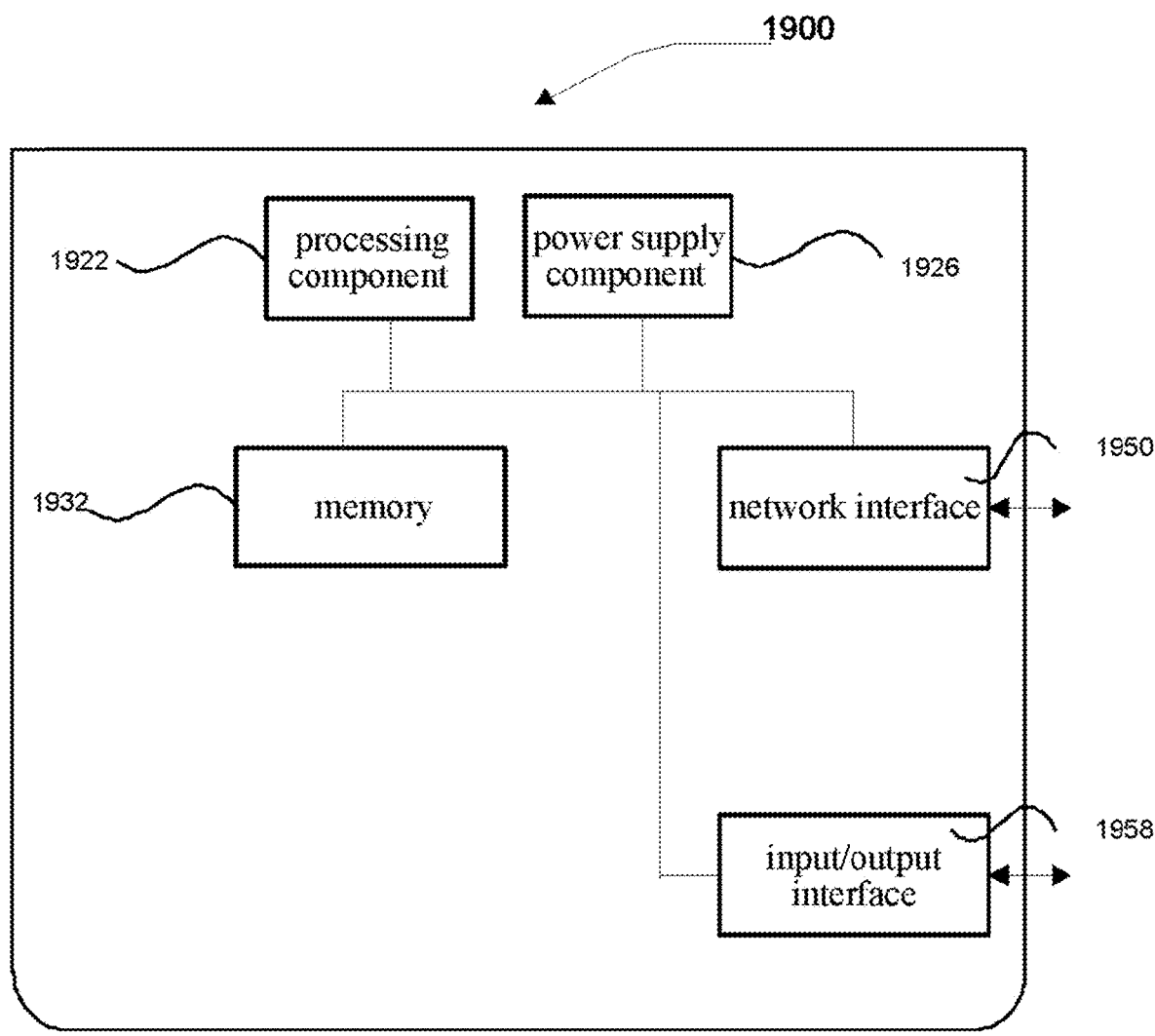
FIG. 8 shows a block diagram of a device for data writing according to an embodiment of the present disclosure.

FIG. 8 is a block diagram of a device for data writing 1900 according to an exemplary embodiment. For example, the device 1900 may be provided as a server. Referring to FIG. 8, the device 1900 includes a processing component 1922 that further includes one or more processors, and memory resources represented by a memory 1932 for storing instructions executable by the processing component 1922, such as an application. An application saved in the memory 1932 may include one or more modules each corresponding to a set of instructions. Additionally, the processing component 1922 is configured to execute instructions to execute the methods described above.

The device 1900 may also include a power supply component 1926 configured to perform power management of the device 1900, a wired or wireless network interface 1950 configured to connect the device 1900 to the network, and an input/output (I/O) interface 1958. The device 1900 may operate based on an operating system saved in the memory 1932, such as Windows Server™, Mac OS X™, Unix™, Linux™, FreeBSD™ or the like.

A non-transitory computer readable storage medium according to an embodiment of the present disclosure, on which computer program instructions are saved, wherein the computer program instructions implement the method when executed by a processor.

In an exemplary embodiment, there is also provided a non-transitory computer readable storage medium, for example, a memory 1932 including computer program instructions, wherein the above computer program instructions are executable by the processing component 1922 of the device 1900 to complete the above method.

The present disclosure may be implemented by a system, a method, and/or a computer program product. The computer program product may include a computer readable storage medium having computer readable program instructions for causing a processor to carry out the aspects of the present disclosure saved thereon.

The computer readable storage medium can be a tangible device that can retain and save instructions used by an instruction executing device. The computer readable storage medium may be, but not limited to, e.g., electronic storage device, magnetic storage device, optical storage device, electromagnetic storage device, semiconductor storage device, or any proper combination thereof. A non-exhaustive list of more specific examples of the computer readable storage medium includes: portable computer diskette, hard disk, random access memory (RAM), read-only memory (ROM), erasable programmable read-only memory (EPROM or Flash memory), static random access memory (SRAM), portable compact disc read-only memory (CD-ROM), digital versatile disk (DVD), memory stick, floppy disk, mechanically encoded device (for example, punchcards or raised structures in a groove having instructions recorded thereon), and any proper combination thereof. A computer readable storage medium referred herein should not to be construed as transitory signal per se, such as radio waves or other freely propagating electromagnetic waves, electromagnetic waves propagating through a waveguide or other transmission media (e.g., light pulses passing through a fiber-optic cable), or electrical signal transmitted through a wire.

Computer readable program instructions described herein can be downloaded to individual computing/processing devices from a computer readable storage medium or to an external computer or external storage device via network, for example, the Internet, local area network, wide area network and/or wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium in the respective computing/processing devices.

Computer readable program instructions for carrying out the operations of the present disclosure may be assembler instructions, instruction-set-architecture (ISA) instructions, machine instructions, machine-related instructions, microcode, firmware instructions, state-setting data, or source code or object code written in any combination of one or more programming languages, including an object oriented programming language, such as Smalltalk, C++ or the like, and the conventional procedural programming languages, such as the "C" programming language or similar programming languages. The computer readable program instructions may be executed completely on the user's computer, partly on the user's computer, as a stand-alone software package, partly on the user's computer and partly on a remote computer, or completely on a remote computer or a server. In the scenario with remote computer, the remote computer may be connected to the user's computer through any type of network, including local area network (LAN) or wide area network (WAN), or connected to an external computer (for example, through the Internet connection from an Internet Service Provider). In some embodiments, electronic circuitry, such as programmable logic circuitry, field-programmable gate arrays (FPGA), or programmable logic arrays (PLA), may be customized from state information of the computer readable program instructions; the electronic circuitry may execute the computer readable program instructions, so as to achieve the aspects of the present disclosure.

Aspects of the present disclosure have been described herein with reference to the flowchart and/or the block diagrams of the method, device (systems), and computer program product according to the embodiments of the present disclosure. It will be appreciated that each block in the flowchart and/or the block diagram, and combinations of blocks in the flowchart and/or block diagram, can be implemented by the computer readable program instructions.

These computer readable program instructions may be provided to a processor of a general purpose computer, a dedicated computer, or other programmable data processing devices, to produce a machine, such that the instructions create means for implementing the functions/acts designated in one or more blocks in the flowchart and/or block diagram when executed by the processor of the computer or other programmable data processing devices. These computer readable program instructions may also be saved in a computer readable storage medium, wherein the instructions cause a computer, a programmable data processing device and/or other devices to function in a particular manner, such that the computer readable storage medium having instructions saved therein comprises a product that includes instructions implementing aspects of the functions/acts designated in one or more blocks in the flowchart and/or block diagram.

The computer readable program instructions may also be loaded onto a computer, other programmable data processing devices, or other devices to have a series of operational steps performed on the computer, other programmable devices or other devices, so as to produce a computer implemented process, such that the instructions executed on the computer, other programmable devices or other devices implement the functions/acts designated in one or more blocks in the flowchart and/or block diagram.

The flowcharts and block diagrams in the drawings illustrate the architecture, function, and operation that may be implemented by the system, method and computer program product according to the various embodiments of the present disclosure. In this regard, each block in the flowchart or block diagram may denote a part of a module, a program segment, or a portion of code, which comprises one or more executable instructions for implementing the designated logical function(s). In some alternative implementations, the functions denoted in the blocks may occur in an order different from that denoted in the drawings. For example, two contiguous blocks may, in fact, be executed substantially concurrently, or sometimes they may be executed in a reverse order, depending upon the functions involved. It will also be noted that each block in the block diagram and/or flowchart, and combinations of blocks in the block diagram and/or flowchart, can be implemented by dedicated hardware-based systems performing the designated functions or acts, or by combinations of dedicated hardware and computer instructions Although the embodiments of the present disclosure have been described above, it will be appreciated that the above descriptions are merely exemplary, but not exhaustive; and that the disclosed embodiments are not limiting. A number of variations and modifications may occur to one skilled in the art without departing from the scopes and spirits of the described embodiments. The terms in the present disclosure are selected to provide the best explanation on the principles and practical applications of the embodiments and the technical improvements to the arts on market, or to make the embodiments described herein understandable to one skilled in the art.

What is claimed is:

1. A method for data writing, comprising:
    acquiring a first data to be written to a storage device, the first data including a plurality of data units (DU), each DU having a same size;
    obtaining an aggregation strategy from a routing table based on a number of DUs in the first data, the routing table including a plurality of entries, each entry representing an aggregation strategy that specifies a correspondence between a length of a data and one or more aggregated queues of different alignments for storing the data, the length of the data represented by one or more DUs;
    determining an offset in the first data for each of the plurality of DUs of the first data, and one or more aggregated queues corresponding to the obtained aggregation strategy for storing the first data;
    saving the plurality of DUs of the first data in one or more aggregated queues, wherein each DU is saved to a particular one of the one or more aggregated queues based on an offset of the DU;
    retrieving the plurality of DUs from the one or more aggregated queues to obtain a second data to be written; and
    writing the second data in a storage device.

2. The method of claim 1, wherein acquiring the first data to be written and saving the plurality of DUs of the first data in the one or more aggregated queues of multiple aggregated queues according to the aggregation strategy comprises:

aggregating according to the aggregation strategy in one or more aggregated queues.

3. The method of claim 1, further comprising:
when saving the plurality of DUs of the first data to the one or more aggregated queues, if a length of DUs for one of the one or more aggregated queues cannot meet an alignment in the aggregated queue, filling the aggregated queue with placeholders to fill up the aggregated queue.

4. The method of claim 3, further comprising:
when writing the second data to the storage device, if a length of consecutive placeholders or a part thereof is equal to an aligned length of any of the one or more aggregated queues and there is data of the aligned length in the aggregated queue, retrieving data of the aligned length from a head of the aggregated queue to replace consecutive placeholders of an equal length; otherwise, filling positions of the placeholders with dummy data.

5. The method of claim 1, wherein retrieving the data from each of the one or more aggregated queues to obtain the second data to be written comprises:
retrieving data from the aggregated queue with a single-plane page or a multi-plane page alignment to obtain a plurality of pieces of target data, and obtaining the second data according to the plurality pieces of target data.

6. The method of claim 5, wherein writing the second data to the storage device comprises:
determining that a total amount of the plurality pieces of target data reaches a threshold; and
in response to determining that the total amount reaching the threshold, writing the second data to the storage device.

7. A device for data writing, comprising:
a processor; and
a memory for storing instructions, which, when executed by the processor, cause the processor to perform operations comprising:
acquiring a first data to be written to a storage device, the first data including a plurality of data units (DU), each DU having a same size;
obtaining an aggregation strategy from a routing table based on a number of DUs in the first data, the routing table including a plurality of entries, each entry representing an aggregation strategy that specifies a correspondence between a length of a data and one or more aggregated queues of different alignments for storing the data, the length of the data represented by one or more DUs;
determining an offset in the first data for each of the plurality of DUs of the first data, and one or more aggregated queues corresponding to the obtained aggregation strategy for storing the first data;
saving the plurality of DUs of the first data in one or more aggregated queues, wherein each DU is saved to a particular one of the one or more aggregated queues based on an offset of the DU;
retrieving the plurality of DUs from the one or more aggregated queues to obtain a second data to be written; and
writing the second data in a storage device.

8. The device of claim 7, wherein acquiring the first data to be written and saving the plurality of DUs of the first data in the one or more aggregated queues of multiple aggregated queues according to the aggregation strategy comprises:
aggregating according to the aggregation strategy in one or more aggregated queues.

9. The device of claim 7, the operations further comprising:
when saving the plurality of DUs of the first data to the one or more aggregated queues, if a length of DUs for one of the one or more aggregated queues cannot meet an alignment in the aggregated queue, filling the aggregated queue with placeholders to fill up the aggregated queue.

10. The device of claim 9, the operations further comprising:
when writing the second data to the storage device, if a length of consecutive placeholders or a part thereof is equal to an aligned length of any of the one or more aggregated queues and there is data of the aligned length in the aggregated queue, retrieving data of the aligned length from a head of the aggregated queue to replace consecutive placeholders of an equal length; otherwise, filling positions of the placeholders with dummy data.

11. The device of claim 7, wherein retrieving the data from each of the one or more aggregated queues to obtain the second data to be written comprises:
retrieving data from the aggregated queue with a single-plane page or a multi-plane page alignment to obtain a plurality of pieces of target data, and obtaining the second data according to the plurality pieces of target data.

12. The device of claim 11, wherein writing the second data to the storage device comprises:
determining that a total amount of the plurality pieces of target data reaches a threshold; and
in response to determining that the total amount reaching the threshold, writing the second data to the storage device.

13. A non-volatile computer readable storage medium storing computer program instructions, which, when, executed by a processor, cause the processor to perform operations comprising:
acquiring a first data to be written to a storage device, the first data including a plurality of data units (DU), each DU having a same size;
obtaining an aggregation strategy from a routing table based on a number of DUs in the first data, the routing table including a plurality of entries, each entry representing an aggregation strategy that specifies a correspondence between a length of a data and one or more aggregated queues of different alignments for storing the data, the length of the data represented by one or more DUs;
determining an offset in the first data for each of the plurality of DUs of the first data, and one or more aggregated queues corresponding to the obtained aggregation strategy for storing the first data;
saving the plurality of DUs of the first data in one or more aggregated queues, wherein each DU is saved to a particular one of the one or more aggregated queues based on an offset of the DU;
retrieving the plurality of DUs from the one or more aggregated queues to obtain a second data to be written; and
writing the second data in a storage device.

14. The non-volatile computer readable storage medium of claim 13, wherein acquiring the first data to be written and saving the plurality of DUs of the first data in the one or more aggregated queues of multiple aggregated queues according to the aggregation strategy comprises:

aggregating according to the aggregation strategy in the one or more aggregated queues.

15. The non-volatile computer readable storage medium of claim 13, the operations further comprising:

when saving the plurality of DUs of the first data to the one or more aggregated queues, if a length of DUs for one of the one or more aggregated queues cannot meet an alignment in the aggregated queue, filling the aggregated queue with placeholders to fill up the aggregated queue.

16. The non-volatile computer readable storage medium of claim 15, the operations further comprising:

when writing the second data to the storage device, if a length of consecutive placeholders or a part thereof is equal to an aligned length of any of the one or more aggregated queues and there is data of the aligned length in the aggregated queue, retrieving data of the aligned length from a head of the aggregated queue to replace consecutive placeholders of an equal length; otherwise, filling positions of the placeholders with dummy data.

17. The non-volatile computer readable storage medium of claim 13, wherein retrieving the data from each of the one or more aggregated queues to obtain the second data to be written comprises:

retrieving data from the aggregated queue with a single-plane page or a multi-plane page alignment to obtain a plurality of pieces of target data, and obtaining the second data according to the plurality pieces of target data.

18. The non-volatile computer readable storage medium of claim 17, wherein writing the second data to the storage device comprises:

determining that a total amount of the plurality pieces of target data reaches a threshold; and in response to determining that the total amount reaching the threshold, writing the second data to the storage device.

* * * * *